US007956280B2

(12) United States Patent
Kobayashi

(10) Patent No.: US 7,956,280 B2
(45) Date of Patent: Jun. 7, 2011

(54) SOLAR CELL MODULE RETAINING STRUCTURE, FRAME FOR SOLAR CELL MODULE, AND HOLDING MEMBER FOR SOLAR CELL MODULE

(75) Inventor: Shuichi Kobayashi, Takahama (JP)

(73) Assignee: Yanegijutsukenkyujo Co., Ltd., Takahama-shi, Aichi (JP)

( * ) Notice: Subject to any disclaimer, the term of this patent is extended or adjusted under 35 U.S.C. 154(b) by 199 days.

(21) Appl. No.: 11/972,193

(22) Filed: Jan. 10, 2008

(65) Prior Publication Data

US 2008/0302407 A1 Dec. 11, 2008

(30) Foreign Application Priority Data

Jun. 11, 2007 (JP) ................................. 2007-153463

(51) Int. Cl.
*H02N 6/00* (2006.01)
*H01L 31/042* (2006.01)
*E04D 13/18* (2006.01)
*E04H 14/00* (2006.01)

(52) U.S. Cl. ........................ 136/251; 52/173.3; 126/704

(58) Field of Classification Search .................. 136/251; 52/173.3; 126/704; 248/237
See application file for complete search history.

(56) References Cited

U.S. PATENT DOCUMENTS 6,105,317 A * 8/2000 Tomiuchi et al. ............ 52/173.3
6,570,084 B2 * 5/2003 Dinwoodie ................... 136/251

FOREIGN PATENT DOCUMENTS

| | | |
|---|---|---|
| EP | 0587348 A2 | 3/1994 |
| JP | 11-159071 B2 | 6/1999 |
| JP | 2000-297509 | 10/2000 |
| JP | 2003-056131 | 2/2003 |
| JP | 2003-278333 | 10/2003 |
| JP | 2003-336357 | 11/2003 |
| JP | 2004-011282 | 1/2004 |

OTHER PUBLICATIONS

English language machine translation of JP 2003-278333.*
English language machine translation of JP 2003-056131.*

* cited by examiner

*Primary Examiner* — Basia Ridley
*Assistant Examiner* — Tamir Ayad
(74) *Attorney, Agent, or Firm* — Apex Juris, PLLC; Tracy M Herms

(57) ABSTRACT

To provide the solar cell module retaining structure, the frame for the solar cell module, and the holding member for the solar cell module, which reduces the number of members relating to the solar cell module retaining structure, standardizes the installation process thereof, and reduces the cost of manufacturing and installing. The solar cell module retaining structure is to fix the solar cell module which comprises the solar cell panel body with the modular glass (6) and the frame (1) to be fixed to the solar panel body to the supporting member (42) via the holding member (2), wherein the frame (1) and the holding member (2) are for the retaining structure of the solar cell module; the holding member (2) can slide relative to the frame (1); the holding member (2) can keep two adjacent frames of two adjacent solar cell modules contacted and restrict one solar cell module from moving in the right angle direction relative to the extending direction of the frame (1); and the holding member (2) is fixed to the supporting member (42) at the lower side of the other solar cell module.

10 Claims, 7 Drawing Sheets

SOLAR CELL MODULE RETAINING STRUCTURE, FRAME FOR SOLAR CELL MODULE, AND HOLDING MEMBER FOR SOLAR CELL MODULE

FIELD OF THE INVENTION

This invention relates to a retaining structure to fix a solar cell module on a roof and a frame and a holding member for the solar cell module.

BACKGROUND OF THE INVENTION

A solar cell module retaining structure to be installed directly on a sheathing slope without placing on a roof material is known as a conventional retaining structure for the solar cell module. For example, as shown in FIG. 6(A), a sway brace 82 is formed on an upward pitch side frame 81 of the downward pitch side solar cell module of two frames 80, 81 of two adjacent solar cell modules extending perpendicularly relative to a downward pitch direction, and the sway brace 82 is tied to a sheathing slope 41, while a upward pitch side fitting portion 84 formed on the upward pitch side frame 81 of the downward pitch side solar cell module fits with a upward fitting portion 83 formed on the downward pitch side frame 80 of the upward pitch side solar cell module (Patent Document 1).

As shown in FIG. 6(B) and FIG. 6(C), other solar cell module retaining structure is such that two adjacent solar cell module frames 92 of the solar cell modules are installed on a mounting base 90 at the same time. An installation portion 93 of the frame 92 slidably fits with an installation portion 91 of the mounting base 90, and the mounting base 90 is installed on a rafter by a bolt 95 (Patent Document 2).

[Patent Document 1] Provisional Patent Publication No. 2000-297509

[Patent Document 2] Provisional Patent Publication No. 2003-336357

However, in the conventional solar cell module retaining structure as described in the Patent Document 1, since the sway braces 82 for the installation of the frame 81 on the sheathing slope 41 are integrally arranged with a predetermined pitch, predetermined positions of the rafters supporting the sheathing slope 41 often do not match positions of the sway braces 82 of the solar cell modules, and the sway braces 82 are not fixed on the rafters properly, thereby creating a chance of reducing the strength of solar cell module attachment.

Also, shapes of the downward pitch side frame 80 and the upward pitch side frame 81 of the solar cell module are different, which increases the number of members and further requires more complex processing of forming sway braces 82 increasing the cost of manufacturing.

In the conventional solar cell module retaining structure as shown in Patent Document 2, since the installation portion 91 of the mounting base 90 is positioned between the frame 92 and the frame 92, an installation area of the solar cell module increases which decreases the number of possibly installing solar cell modules. Furthermore, because the frame 92 and the frame 92 open, in order to improve the design, a member such as a cover to cover a surface of such as the mounting base 90 is necessary which increases the cost of manufacturing.

Then, in consideration of the above-descriptions, by reducing the number of members relating to the solar cell module retaining structure and standardizing the installation process, this invention provides the solar cell module retaining structure, solar cell module frame, and the holding member which reduce the cost of manufacturing and installation and improve the design thereof.

SUMMARY OF THE INVENTION

The solar cell module retaining structure according to this invention that retains a solar cell module, which has a flat polygon solar cell panel body with a solar cell and frames adjacent to the solar cell panel body to fix at least a pair of facing sides thereof, on a supporting member by connecting holding members with frames at each facing sides of the solar cell module, said frames are comprised of: an insertion support portion which has an opening at a first side surface side and into which a peripheral portion of the solar cell panel body is inserted to be supported; a connection portion which is arranged at a lower side of the insertion support portion and has an opening at a second side surface side at an opposite side of the first side surface; and an engagement protrusion which is arranged at a lower side of the connection portion and has an opening at the second side surface side to project upward; and is designed to have a same cross-section shape and in a long shape; said holding member is comprised of: a pair of connecting portions insertable in the connection portion and extending in a direction to depart from each other; a down section extending downward from the pair of the connecting portions; a seat section arranged at a lower end of the down section and capable of mounting a bottom of the frame thereon; an engagement piece having an engagement protrusion portion positioned between the seat section and the connecting portion and extending from the down section in the same direction of the connecting portion to project an end downward so as to engage the engagement protrusion section; and a holding portion having a lower surface on the same surface of the lower surface of the seat section and extending in an opposite direction of the engagement piece extension so as to be fixed to the supporting member; and is designed to have a same cross-section shape and shorter than the frame; wherein the holding members are slidable relative to the frames, attaches the frames of two solar cell modules arranged in an extending direction of the supporting member to arrange the solar cell modules to make an almost flush surface, restricts one of the two solar cell modules to move in a right angle direction relative to an extending direction of the frames, and is fixed to the supporting member at a lower side of the solar cell module.

Here, the supporting member means a roof structure member, and for example, it is such as a sheathing slope and rafter for timber constructions and a main house for steel frame building, which should be sufficient to maintain the required strength thereof.

According to this invention, this invention is a solar cell module retaining structure, retaining a solar cell module, which has a flat polygon solar cell panel body with a solar cell and frames adjacent to said solar cell panel body to fix at least a pair of facing sides thereof, on a supporting member by connecting holding members with frames at each facing sides of the solar cell module, wherein the holding members are slidable relative to the frames, attaches the frames of two solar cell modules arranged in an extending direction of the supporting member to arrange the solar cell modules to make an almost flush surface, restricts one of the two solar cell modules to move in a right angle direction relative to an extending direction of the frames, and is fixed to the supporting member at a lower side of the solar cell module.

As such, the holding member is connected to the frame, and the holding member can be supported at the supporting member. Also, because the holding member is designed to be slidable relative to the frame, for example, when fixing on the sheathing slope of the roof, the holding member can be slid to one position where there is the supporting member (structural members) such as the rafter, which is supporting the sheathing slope with the predetermined interval, and the holding member is installed at the position so that the holding member is tightly installed, thereby holding the solar cell module tighter.

Also, after fixing one solar cell module to the supporting member via the frames by the holding member, the frame of the other solar cell module can be fixed by the holding member, so that plural solar cell modules may be fixed from one direction in order, which helps to establish the installation standard and reduce the cost of manufacturing. Also, when the holding member is fixed to the supporting member, since a portion of the holding member to be fixed to the supporting member is being fixed to the supporting member at the lower side of the other solar cell module, the frames are contacting each other. Furthermore, the solar cell modules are arranged to make an almost flush surface, thereby eliminating a clearance between the solar cell modules, which improves the design, and eliminating an unnecessary member such as a cover.

Also, because the frames of the solar cell modules arranged adjacent to each other are connected to each other, as long as the solar cell modules are in the same size, an installation surface of the solar cell module can be minimized, thereby preventing the reduction of the number of installation of the solar cell modules on such as roof. Furthermore, because the frames are designed to have matching same cross section surfaces as two facing sides of the solar cell module, the frames with different cross section surface shapes as shown in the Patent Document 1 are not necessary for the solar cell module to be fixed to the supporting member, which reduces the number of parts to cut down the manufacturing cost of the solar cell module retaining structure.

Also, the same frames (as stated-above) can be fixed to all sides of the solar cell panel body, or the frames are fixed to a pair of faxing sides and frames with different cross section shape (for example, side surface frame) can be fixed to the sides orthogonal to the sides fixed to the frames.

The solar cell module retaining structure relating to this invention, in addition to the above-described structure, is characterized in that the other solar cell module is placed on a roof slope at a downward pitch side thereof with the holding member therebetween.

The solar cell module according to this invention is such that the other solar cell module is placed on the roof slope at the downward pitch side thereof with the holding member therebetween. That is, the holding member which fixes the downward pitch side of the upward pitch side of the solar cell module is used to fix the downward pitch side of the solar cell module placed at the upward pitch side thereof.

As such, the upward pitch side of the solar cell module is fixed relative to the holding member, which fixes the downward pitch side of the solar cell module, because of self-weight of the solar cell module, it can easily be fixed, and the upward pitch of the solar cell module can also be fixed by the holding member, thereby completely fixing the solar cell module. Accordingly, multiple solar cell modules can be fixed from the downward pitch side to the upward pitch side in order, and the standardization of the installation and installation cost reduction become possible.

Also, because of the above-described solar cell module retaining structure, as a solar cell module installation method, for example, the holding member as a starter hardware can be fixed at the downward pitch side of the roof or the supporting member first, and the frame at one side of the solar cell module is connected with the holding member (starter hardware). Here, a decorative cover of the holding member can be fixed at the downward pitch side of the holding member. As such, this gives a feeling of integrity with the roof and improves the design. Then, for the solar cell module, the holding member is connected to the side (downward pitch side) opposite to the side where the starter hardware is connected. There, a portion of the holding member fixed to the supporting member of the holding member is connected to the frame of the solar cell module so as to face a direction of the side (downward pitch side) opposite to the solar cell module. Then, the holding member is slid relative to the frame, and the holding member is fixed to the structural members such as the rafter of the supporting member. Next, relative to the holding member which fixes the first solar cell module, the second solar cell module is connected at the downward pitch side thereof. Accordingly, two adjacent frames of the solar cell modules are contacting each other, and the holding members are fixed to the supporting members at the lower side of two solar cell module. Thereafter, in two solar cell modules, the holding member is fixed to the frame at the other side (downward pitch side), and as stated above the holding member is fixed to the supporting member so as to completely fix the second solar cell module, wherein the above-described operation can be repeated to fix the solar cell modules to the supporting members in order toward the downward pitch side. Accordingly, according to the solar cell modules of this invention, relative to the supporting member, multiple solar cell modules can be fixed in order in one direction from a certain point (for example, the starter hardware), and the standardization of the installation and installation cost reduction become possible.

The solar cell module retaining structure relating to this invention, in addition to the above structures, the frame is comprised of an insertion support portion which has an opening at a first side surface side and into which a peripheral portion of the solar cell panel body is inserted to be supported, a connecting section which is arranged at a lower side of the insertion support portion and has an opening at a second side surface side at an opposite side of the first side surface, and an engagement protrusion which is arranged at a lower side of the connection portion and has an opening at the second side surface side to project upward, and the holding member is comprised of a pair of connecting portions insertable in the connection portion and extending in a direction to depart from each other; a down section extending downward from the pair of the connecting portions; a seat section arranged at a lower end of the down section and capable of mounting a bottom of the frame thereon, an engagement piece having an engagement protrusion portion positioned between the seat section and the connecting portion and extending from the down section in the same direction of the connecting portion to project an end downward so as to engage the engagement protrusion section; and a holding portion having a lower surface on the same surface of the lower surface of the seat section and extending in an opposite direction of the engagement piece extension so as to be fixed to the supporting member, and is designed to have a same cross-section shape and shorter than the frame.

According to this invention, in the solar cell module retaining structure, the frame is comprised of an insertion support portion which has an opening at a first side surface side and into which a peripheral portion of the solar cell panel body is inserted to be supported, a connection portion which is arranged at a lower side of the insertion support portion and has an opening at a second side surface side at an opposite side of the first side surface, and an engagement protrusion which is arranged at a lower side of the connection portion and has an opening at the second side surface side to project upward, and the holding member is comprised of a pair of connecting portions insertable in the connection portion and extending in a direction to depart from each other; a down section extending downward from the pair of the connecting portions; a seat section arranged at a lower end of the down section and capable of mounting a bottom of the frame thereon, an engagement piece having an engagement protrusion portion positioned between the seat section and the connecting portion and extending from the down section in the same direction of the connecting portion to project an end downward so as to engage the engagement protrusion section; and a holding portion having a lower surface on the same surface of the lower surface of the seat section and extending in an opposite direction of the engagement piece extension so as to be fixed to the supporting member, and is designed to have a same cross-section shape and shorter than the frame.

As such, using the insertion support portion of the frame, a conventional module glass (solar cell panel body) with solar cells necessary for generating electricity can be inserted and supported. Also, the connection portion is opening at the lower side of the insertion support portion and at the other side surface side opposite to one side surface side so as to be able to connect to the connecting portion, thereby preventing the solar cell module from disengaging from the roof due to such as a wind load and an earthquake load. Also, engagement between the engagement protrusion and the engaging protrusion arranged at the lower side of the connection portion prevents the frame and the holding member from disengaging. Furthermore, the holding member is designed shorter than the frame, and the holding member can freely slide as long as it is shorter than the frame. Accordingly, the holding member is slid relative to the frame when installing, and the holding member can easily be fixed to the structural members such as the rafter of the supporting member. Also, for example, shapes of the engagement protrusion and the engaging protrusion are arrow shapes, wherein the holding member can engage with the frame as necessary when installing, the shapes thereof give strong engagement force.

Also, the holding member for fixing the supporting member extends from the seat section, and the holding section can be fixed to the structural member such as the rafter at the supporting member, thereby preventing the solar cell module from disengaging from the roof due to an external force transmitted through the frames. Also, in order to place the holding member at the downward pitch side of the solar cell module when installing to be fixed to the supporting member, the holding member extends in an opposite direction of the extending direction of the engagement piece, and therefore when fixing the holding member to the supporting member by a fastener such as bolts, the holding member, frame, and solar cell module do not interfere with installation tools, which increases installability of the device.

The solar cell module retaining structure relating to this invention, in addition to the above structures, is characterized in that the frame has an upper portion at an opening side of the connection portion thereof that inclines, and the holding member has a portion inclines at a lower side of a connecting portion end.

According to this invention, in the solar cell module retaining structure, the frame has an upper portion at an opening side of the connection portion thereof that inclines, and the holding member has a portion inclines at a lower side of a connecting portion end.

Accordingly, the connecting portion of the holding member and the connection portion of the frame incline so that the other side of the solar cell module, when connecting the connecting portion to the connection portion, is set higher and diagonal so as to be able to prevent the interference between the connecting portion and the connection portion as inserting the connecting portion into the opening of the connection portion and to connect the solar cell module as being diagonal, thereby facilitating the installation process and reducing the cost of manufacturing process.

The solar cell module retaining structure relating to this invention is characterized in that the solar cell module further comprises a side surface frame that is fixed to a side different from a side where the frame is fixed around the solar cell panel body and has a notched groove through which the holding member can pass and a side surface cap that covers the notched groove of the side surface frame and is fixed to the frame, wherein by removing the side surface cap, while the holding member is supported at the supporting member, the solar cell module fixed by the holding member can be slid in an extending direction of the frame to remove the solar cell module from the holding member.

Here, when the holding member is designed to fix and support at the supporting member of such as the roof using the fasteners such as bolts, there is a possibility of water leakage of such as rain from a front surface to back surface of the supporting member passing through the fasteners to be fixed at the supporting member. In addition, there is a possibility of the fasteners becoming unstable due to a convex-concave shape of the surface of the supporting member of such as the roof and unable to tightly fix the frame of the solar cell module due to the inclination thereof. As such, a waterproof rubber made of such as butyl rubber can be used between the holding member and the supporting member, which stops the leakage and absorbs the gaps of convex-concave surfaces of the supporting member. However, in this case, when conducting a maintenance job of the solar cell module, if the holding member is disengaged from the supporting member of such as the roof to remove the solar cell module, there is a possibility of breaking the roof material by the waterproof rubber attached to the lower side of the holding member when pealing the holding member from the roof material. Furthermore, removal of the fastener for fixing the holding member increases a risk of leakage from that spot and at the same time reduces the strength of the fastener when fastening the holding member by the fastener at the original location (same location).

The solar cell module retaining structure relating to this invention is characterized in that the solar cell module further comprises a side surface frame that is fixed to a side different from a side where the frame is fixed around the solar cell panel body and has a notched groove through which the holding member can pass and a side surface cap that covers the notched groove of the side surface frame and is fixed to the frame, wherein by removing the side surface cap, while the holding member is supported at the supporting member, the solar cell module fixed by the holding member can be slid in an extending direction of the frame to remove the solar cell module from the holding member.

As such, since the side surface frame has the notched groove in an appropriate size without interfering with the frame and holding member, after installing the solar cell module, the solar cell module can be removed without disengaging the holding member from the roof while conducting the maintenance operation, which provides the maintenance operation that dramatically reduces the risk of breaking the roof material due to the removal of the holding member from the roof material and the risk of leakage. Also, since the solar cell module can be removed without disengaging the holding member, the solar cell module after the maintenance can be tightly fixed and the process can be repeated without reducing the strength of connection between the holding member and the supporting member such as roof material by the fastener. Here, the side surface frame can have the same cross section shape as the frame or different from the cross section shape.

Also, since the solar cell modules arranged close to each other can be communicated by the side surface cap, the frames, side surface cap, and side surface cap of the solar cell module are fixed to the frame using a metal fastener such as a screw, so that one solar cell module and the adjacent other solar cell module can be electrically communicatable via the side surface cap and the metal fastener. Accordingly, when installing groundings between the solar cell modules, there is no need to separately install the cables for groundings and prepare additional parts for the groundings, and the solar cell modules can easily be connected each other, which reduces the cost in relation to the grounding. Also, in addition to the connection of the holding member, adjacent solar cell modules can be jointed by the side surface caps, and in case of a part of the holding member being disengaged from the supporting member, the solar cell module is jointed to the other solar cell module fixed to the supporting member by the side surface caps, which prevents the solar cell module from falling down from the roof material such as the supporting member and prevents collateral damages.

The frame comprising: a pair of connecting portions insertable in the connection portion and extending in a direction to depart from each other; a down section extending downward from the pair of the connecting portions; a seat section arranged at a lower end of the down section and capable of mounting a bottom of the frame thereon; an engagement piece having an engagement protrusion portion positioned between the seat section and the connecting portion and extending from the down section in the same direction of the connecting portion to project an end downward so as to engage the engagement protrusion section; and a holding portion having a lower surface on the same surface of the lower surface of the seat section and extending in an opposite direction of the engagement piece extension so as to be fixed to the predetermined supporting member; and is fixable to supporting member by holding member which is designed to have a same cross-section shape and in predetermined long shape and is for a solar cell module; said frame is for the solar cell module relating to this invention is characterized in that the frame has a solar cell in a solar cell module and being fixed to at least a pair of facing sides around a flat polygon solar cell panel body, comprising an insertion support portion which has an opening at a first side surface side and into which a peripheral portion of the solar cell panel body is inserted to be supported, a connection portion which is arranged at a lower side of the insertion support portion and has an opening at a second side surface side at an opposite side of the first side surface, an engagement protrusion which is arranged at a lower side of the connection portion and has an opening at the second side surface side to project upward, said frame is extended in a long shape in a cross section.

According to this invention, the frame is for a solar cell module retaining structure having a solar cell in a solar cell module and being fixed to at least a pair of facing sides around a flat polygon solar cell panel body, comprising an insertion support portion which has an opening at a first side surface side and into which a peripheral portion of the solar cell panel body is inserted to be supported, a connection portion which is arranged at a lower side of the insertion support portion and has an opening at a second side surface side at an opposite side of the first side surface, an engagement protrusion which is arranged at a lower side of the connection portion and has an opening at the second side surface side to project upward, the frame is extended in a long shape in a cross section.

As such, using the insertion support portion of the frame, a conventional module glass (solar cell panel body) with solar cells necessary for generating electricity can be inserted and supported. Also, the connection portion is opening at the lower side of the insertion support portion, and the connecting portion of the holding member to be fixed to the supporting member via the connection portion is connected so as to fix the frame to the supporting member, thereby preventing the solar cell module from disengaging from the roof due to such as a wind load and an earthquake load. Also, the engagement protrusion is arranged at the lower side of the connection section, and by engaging the engaging protrusion of the holding member with the engagement protrusion, disengagement of the frame from the holding member at the installation process can be avoided. Accordingly, the frame can be more firmly fixed to the supporting member. Furthermore, cross section shapes of the frames are same and are extended in a long shape, and therefore the frames can be easily made such as by extrusion, which reduces the cost of manufacturing the frames.

The holding member of the solar cell module retaining structure relating to this invention is characterized in that the holding member for the solar cell module is to fix the solar cell module to a predetermined supporting member via the frames, said frame is comprised of: an insertion support portion which has an opening at a first side surface side and into which a peripheral portion of the solar cell panel body is inserted to be supported; a connection portion which is arranged at a lower side of the insertion support portion and has an opening at a second side surface side at an opposite side of the first side surface; and an engagement protrusion which is arranged at a lower side of the connection portion and has an opening at the second side surface side to project upward; and is designed to have a same cross-section shape and in a long shape and is for a solar cell module; wherein the holding member is comprised of a pair of connecting portions insertable in the connecting section and extending in a direction to depart from each other; a down section extending downward from the pair of the connecting portions; a seat section arranged at a lower end of the down section and capable of mounting a bottom of the frame thereon, an engagement piece having an engagement protrusion portion positioned between the seat section and the connecting portion and extending from the down section in the same direction of the connecting portion to project an end downward so as to engage the engagement protrusion section; and a holding portion having a lower surface on the same surface of the lower surface of the seat section and extending in an opposite direction of the engagement piece extension so as to be fixed to the supporting member, and is designed to have a same cross-section shape and shorter than the frame.

According to this invention, the holding member of the solar cell module retaining structure is to fix the solar cell module to a predetermined supporting member via the frames, wherein the holding member is comprised of a pair of connecting portions insertable in the connecting section and extending in a direction to depart from each other; a down section extending downward from the pair of the connecting portions; a seat section arranged at a lower end of the down section and capable of mounting a bottom of the frame thereon, an engagement piece having an engagement protrusion portion positioned between the seat section and the connecting portion and extending from the down section in the same direction of the connecting portion to project an end downward so as to engage the engagement protrusion section; and a holding portion having a lower surface on the same surface of the lower surface of the seat section and extending in an opposite direction of the engagement piece extension so as to be fixed to the supporting member, and is designed to have a same cross-section shape and shorter than the frame.

As such, by connecting the connecting portion of the holding member to the connection portion of the frame, the solar cell module can be fixed via the frames, thereby preventing the solar cell module from disengaging from the roof due to such as a wind load and an earthquake load. Also, engagement between the engagement protrusion and the engaging protrusion prevents the frame and the holding member from being disengaged. Also, the holding member has a pair of connecting portions and the connection portions both extending in the direction to depart from each other, and by inserting and connecting the connection portion of the respective frame to the pair of connecting portions, the frames with the same cross section shapes can be connected without problems.

Also, the holding member is designed shorter than the frame, and therefore the holding member can freely slide as long as it is shorter than the frame, and by sliding the holding member relative to the frame in the installation process, the structure member such as the rafter in the supporting member can easily be fixed to the holding member. Also, the holding member for fixing the supporting member extends from the seat section, and the holding section can be fixed to the structural member such as the rafter at the supporting member, thereby preventing the solar cell module from disengaging from the roof due to an external force transmitted through the frames. Also, since the holding member to be fixed to the supporting member extends in the direction opposite to the extending direction of the engagement piece, while the solar cell module frame is connecting relative to the connecting portion at the side with the engagement piece, when the holding portion of the holding member is fixed by the fastener such as bolts, for example interference of the solar cell module to be fixed interferes with such as installing tools can be avoided. Furthermore, the cross section shapes of the holding members are same and are extended in a long shape, and therefore the holding member can be easily made such as by extrusion and cutting at the proper length, which reduces the cost of manufacturing the frames.

In addition to the above structures, the holding member for the solar cell module of this invention is characterized in that the holding member is designed such that the seat section extends longer than the extension of the connecting portion.

According to this invention, the holding member is such that the seat section extends longer than the extension of the connecting portion.

Accordingly, in the installing process of the solar cell module, when the other solar cell module is connected to the holding member fixing one solar cell module, after the bottom portion of the frame is mounted on the upper portion of the seat section, the solar cell module is slid in the direction of the downstream portion of the holding member to connect the connection portion of the frame and the connecting portion of the holding member, and at that time, because the seat section of the holding member is longer than the extension of the connecting portion, the bottom portion of the frame can be easily mounted on the seat section, which improves the installability.

In addition to the above described structures, the holding member of the solar cell module of this invention is characterized in that the holding member such that the height thereof is designed for the seat section to sufficiently form a clearance between the lower surface of the frame and the supporting member, through which a module cable connected to the solar cell panel body, can pass, and an upper surface of the solar cell module body is adjustable so that height thereof is approximately equal to a roof material mounted on the supporting member.

According to this invention, the holding member is such that the height thereof is designed for the seat section to sufficiently form a clearance between the lower surface of the frame and the supporting member, through which a module cable connected to the solar cell panel body, can pass, and an upper surface of the solar cell module body is adjustable so that height thereof is approximately equal to a roof material mounted on the supporting member.

As such, the height adjustment can be done by the adjacent roof materials using the seat sections of the holding members. For example, a flat roof made from asphalt single or straight roof material can be arranged to be lowered for a module cable or cable connector to pass therethough, and the distance/height between the roof material and the bottom surface of the frame can be in the range of 5 mm-20 mm (e.g., 7 mm). Also, the surfaces of the adjacent roof materials and the frames can have approximately same height when the roof materials are thicker such as roof tiles. Adjustment of the height provides the feeling of integrity with the building/house itself which improves the design thereof.

As stated above, according to this invention, by reducing the number of members relating to the solar cell module retaining structure and standardizing the installation process, this invention provides the solar cell module retaining structure, solar cell module frame, and the holding member which reduce the cost of manufacturing and installation.

BRIEF DESCRIPTION OF THE DRAWINGS

The above and other objects of the present invention will become readily apparent by reference to the following detailed description when considered in conjunction with the accompanying drawings wherein.

PREFERRED EMBODIMENTS OF THE INVENTION

Figure 1:
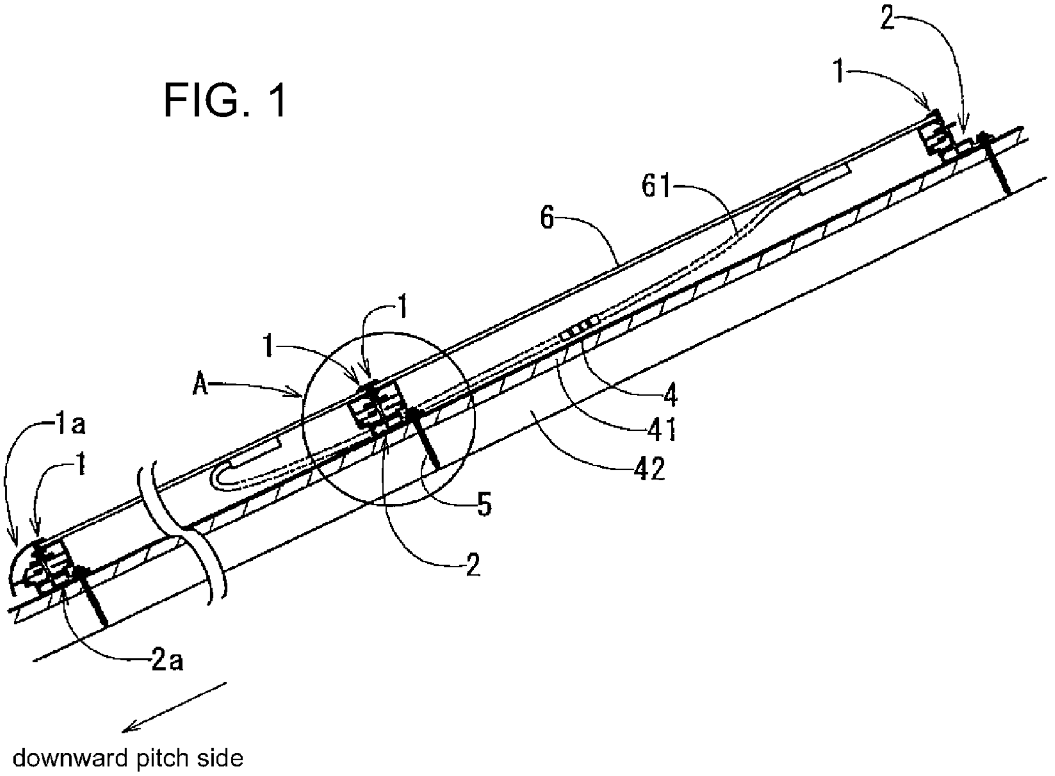
FIG. 1 is a cross section view of one embodiment of this invention showing the frames for the solar cell modules and the solar cell module retaining structure using the holding members.
Figure 2:
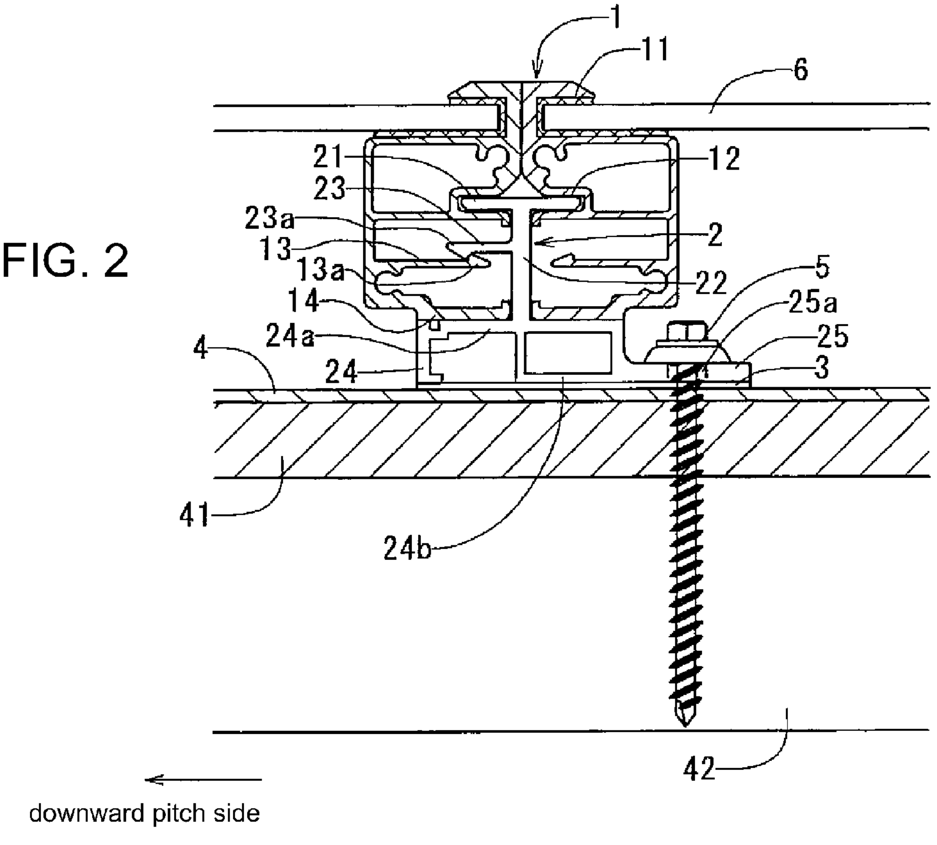
FIG. 2 is an enlarged cross section view of the enlarged A in FIG. 1.
Figure 3:
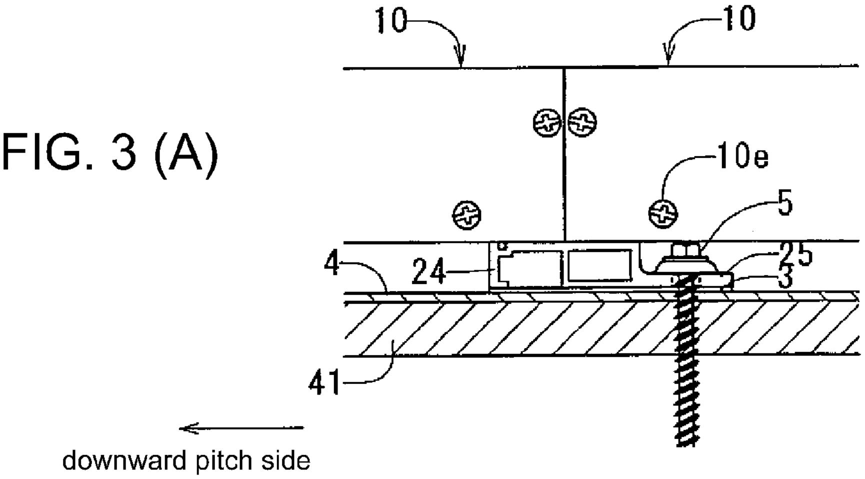
FIG. 3(A) is a side surface view of FIG. 2.
FIG. 3(B) is a side surface view of the side surface frames and side surface caps different from FIG. 3(A)
FIG. 3(C) is a side surface view of one portion FIG. 3(B) in cross section.
Figure 3:
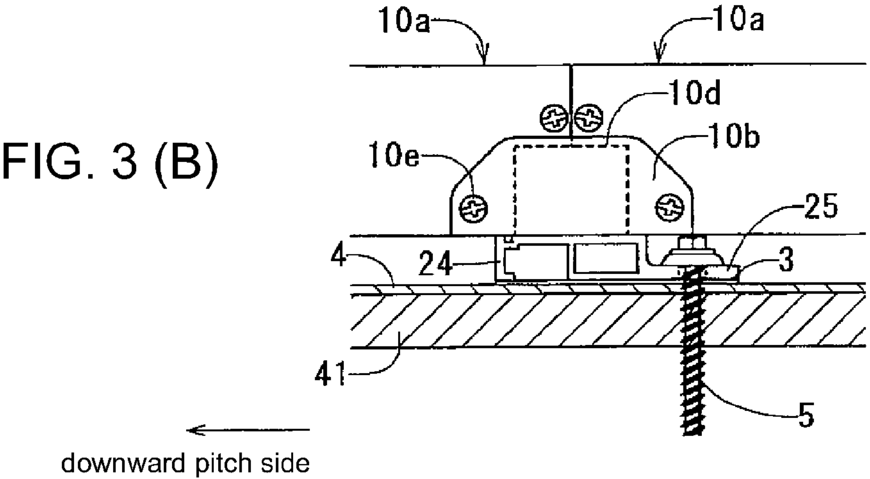
Figure 3:
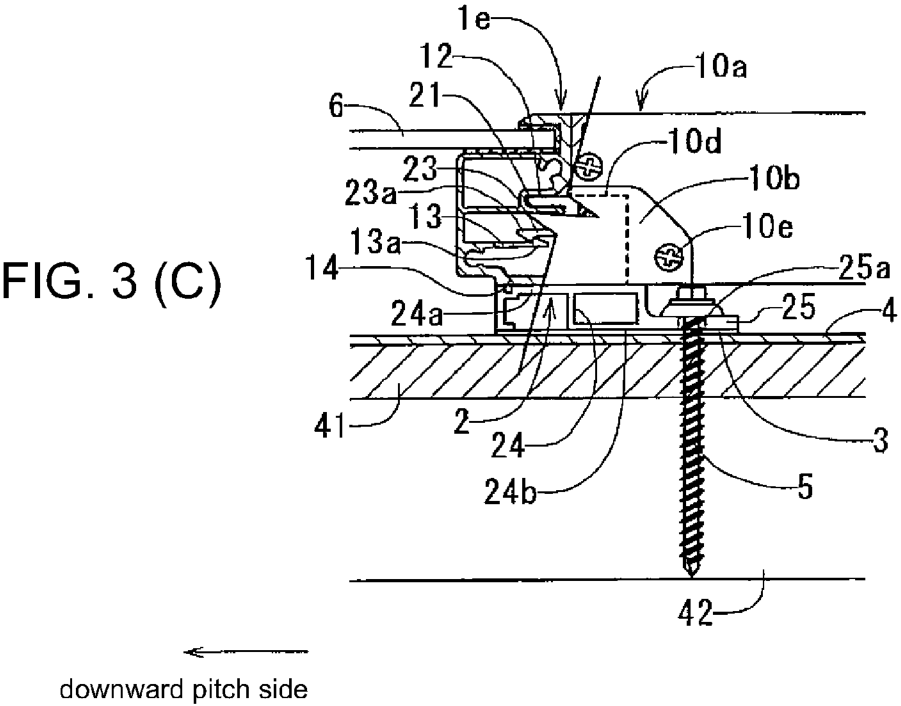
Figure 4:
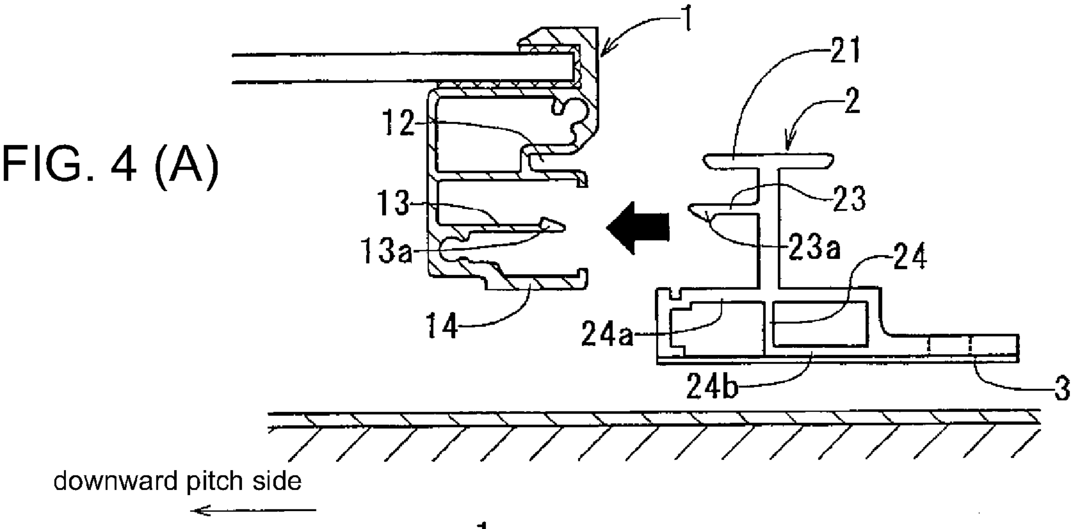
FIG. 4 is an explanation view of the installation process summary for the solar cell module in FIGS. 1 and 2.
Figure 4:
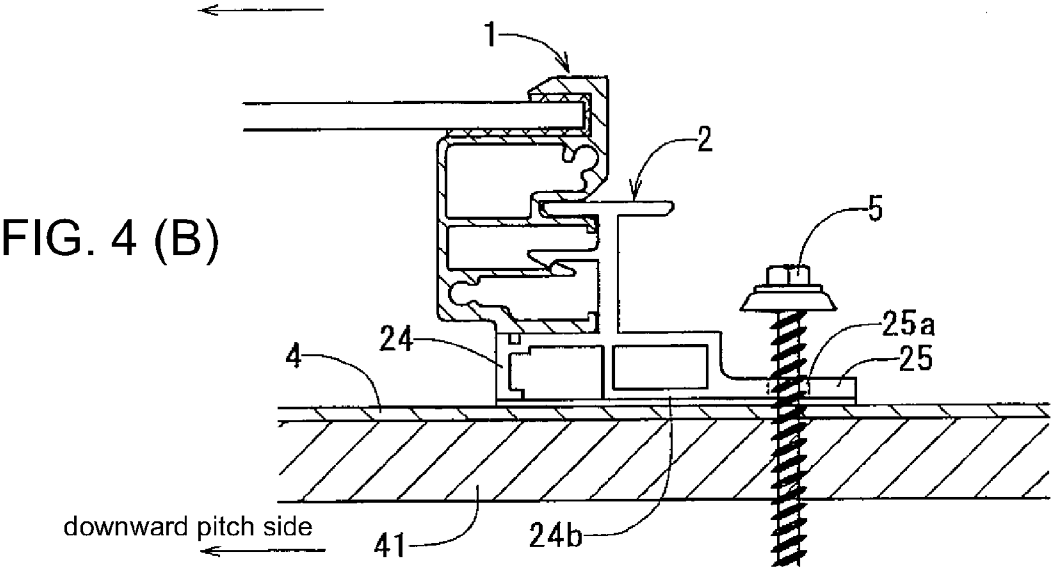
Figure 4:
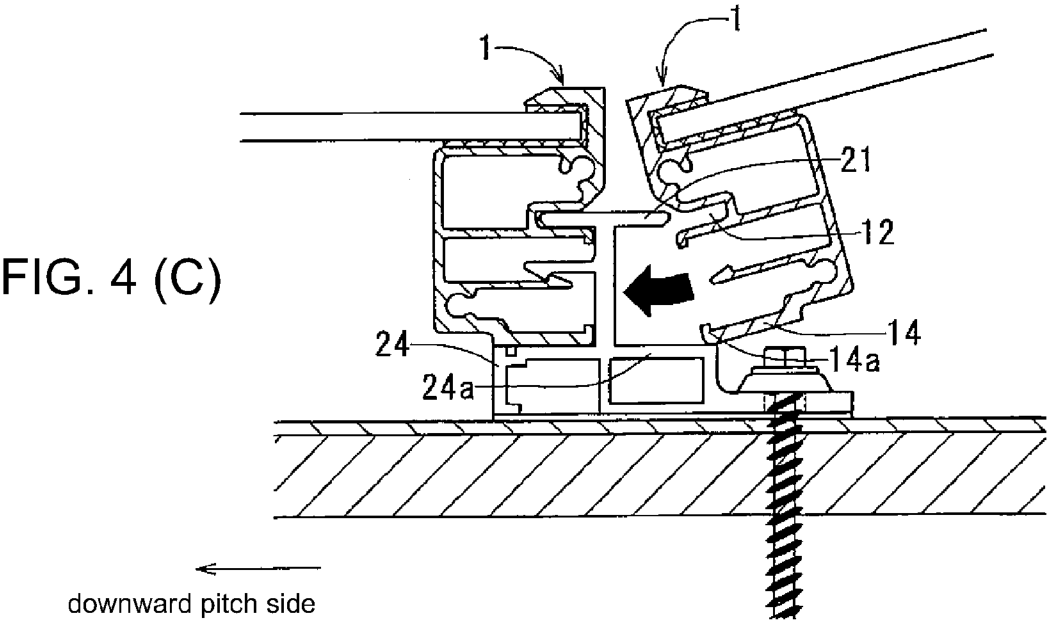
Figure 5:
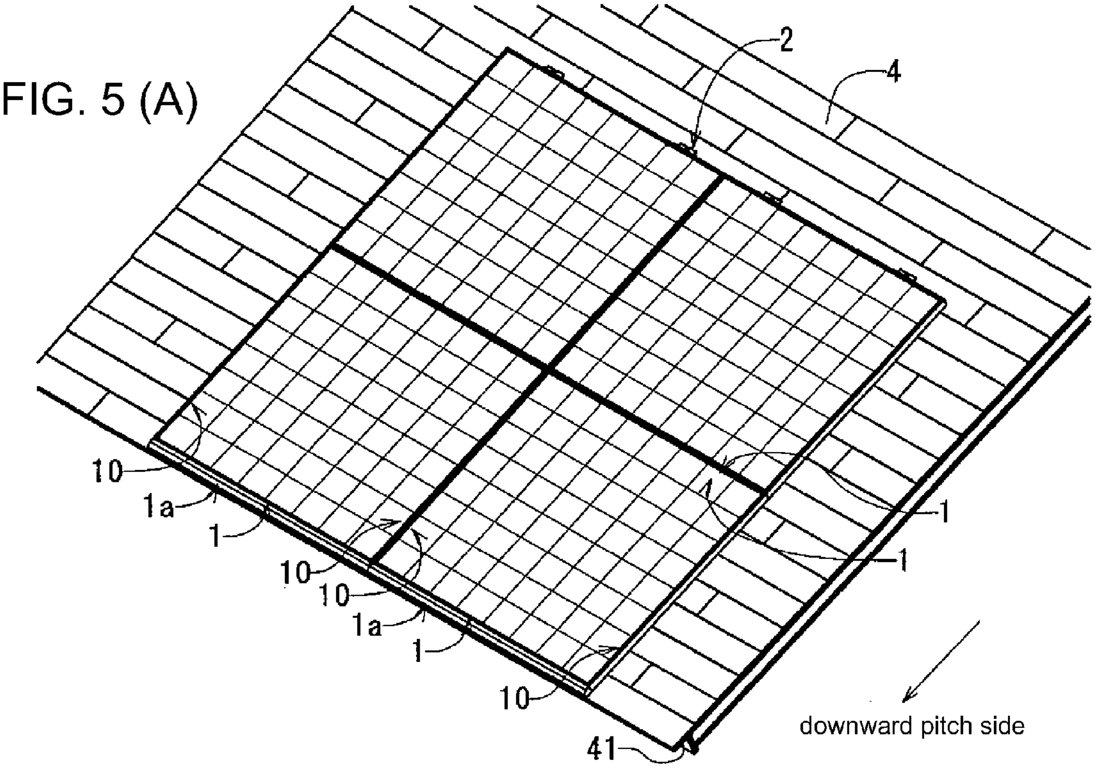
FIG. 5(A) is a perspective view of the condition where the solar cell module is installed on the roof material using the solar cell module retaining structure as shown in FIG. 1.
FIG. 5(B) is a perspective view of the condition where the height of the solar cell module and the adjacent roof material are approximately the same using the solar cell module retaining structure as shown in FIG. 1.
Figure 5:
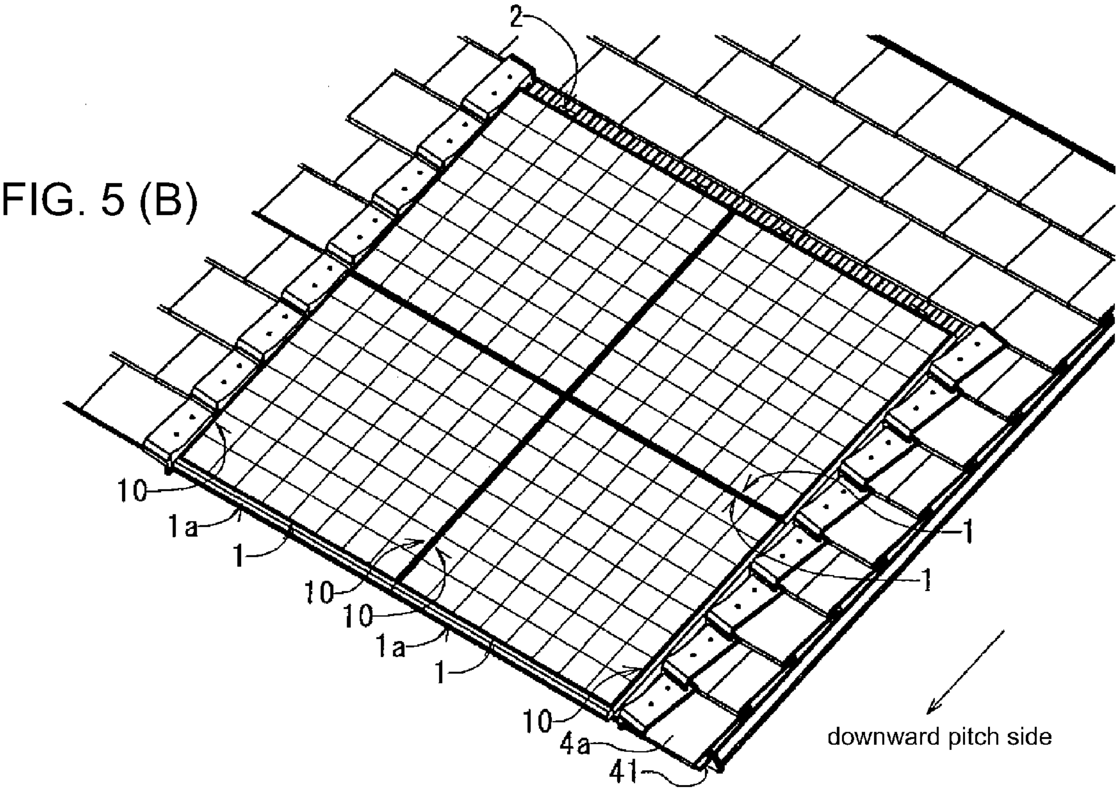

In the following sections, preferred embodiments of this invention for the solar cell module retaining structure, frames for the solar cell modules, and holding members for the solar cell modules will be explained with reference to FIGS. 1-5. FIG. 1 is a cross section view of one embodiment of this invention showing the frames for the solar cell modules and the solar cell module retaining structure using the holding members. FIG. 2 is an enlarged cross section view of the details of A in FIG. 1. FIG. 3(A) is a side surface view of FIG. 2; FIG. 3(B) is a side surface view of the side surface frames and side surface caps different from FIG. 3(A); and FIG. 3(C) is a side surface view of one portion FIG. 3(B) in cross section. FIG. 4 is an explanation view of the installation process summary for the solar cell module in FIGS. 1 and 2. FIG. 5(A) is a perspective view of the condition where the solar cell module is installed on the roof material using the solar cell module retaining structure as shown in FIG. 1; and FIG. 5(B) is a perspective view of the condition where the height of the surface of the solar cell module and the adjacent roof material are the same using the solar cell module retaining structure as shown in FIG. 1.

In the solar cell module retaining structure utilizing a frame 1 and a holding member 2 for the solar cell module of this embodiment, as shown in FIG. 1, the frame 1 is slidable at a position of supporting member 42 such as a rafter which supports a sheathing slope 41 with a predetermined interval and is completely fixed by the holding member 2 using a fastener 5 (for example bolts). The frames 1 adjacent to two solar cell modules positioned in an extending direction of the supporting member 42 are contacting and connected to make an almost flush surface. Also, this example uses a cosmetic cover 1*a* which improves the design of the solar cell module at a downward pitch side (solar cell allay).

More specifically, as shown in FIGS. 2 and 4(A), a cross section shape of the frame 1 for the solar cell module has a rectangle portion with a rectangle bottom surface arranged around middle section thereof relative to the height of the frame 1; a C-shaped insertion support portion 11 formed on a right surface thereof which has an opening at one side surface side and into which an end of a module glass 6 in a solar cell panel body is inserted and supported; and a connection portion 12 formed and opened at the other side surface side opposite to one side surface side around a lower right internal portion of the rectangular. Then, there is a L-shaped bottom portion 14 which extends from one side surface side of the rectangular to a lower side thereof, and then to the other side surface side. Furthermore, an engagement protrusion 13 has an allow-shaped end portion 13*a* around a center of the connection portion 12 and the bottom portion 14, which extends in the same direction of the bottom portion 14 and has a top projecting upward. Also, a publicly known sealing member is placed between the end of the module glass 6 and the insertion support portion 11.

Also, as shown in the figures, the other side surface side of the frame 1 (center of FIG. 4(A) or right side surface) has a most projected section approximately from an upper surface and the insertion support portion 11, and the amount of the projection around the lower portion of the connection portion at the lower side than the most projected section, the engagement protrusion 13, and the other side surface side end of the bottom portion 14 is toward one side surface side and less than that of the section around the above-described insertion support portion 11. As such, when the other side surface sides of the adjacent frames 1 are connected each other, as shown in FIG. 1, sections from the upper surfaces to the insertion support portions 11 of the frames 1 are being contacting, and the sections located lower than that contacting sections have a clearance between the contacting frames 1. Here, the other side surface side end of the engagement protrusion 13 is positioned more toward one side surface side than the bottom portion 14.

Also, as shown in the figures, at an upper portion of the opening side of the connection portion 12 of the frame 1 has a C-shaped chamfer, and the C-shaped chamfer makes the upper portion of the opening of the connection portion 12 incline. Also, an end of the lower portion of the opening side of the connection portion 12 of the frame 1 and an end of the other side surface side of the bottom portion 14 are bent together in the facing directions, where these other side surface side ends are positioned on an almost flush surface line (i.e., the amount of projection at the other side surface side is same). Then, the frame 1 has screw holes at an inner side of the other side surface side between the insertion support portion 11 and the connection portion 12 and an inner side of one side surface side between the engagement protrusion 13 and the bottom portion 14, which for example can be used to assemble the frames 1 to build a framework. Here, a material of the frame 1 is an aluminum extruded material with the same cross section shapes, and colors thereof can be such as black, silver, and brown.

In addition, in this embodiment, as shown in FIG. 3, the module glasses 6 has a pair of facing sides (downward pitch side and upward pitch side) where the frames 1 are fixed, and side surface frames 10, 10*a* are fixed on sides orthogonal to the pair of facing sides, where the side surface frames 10, 10*a* are fixed at the ends of the frames 1 by frame fixing screws 10*e*. As such, the frames 1 and the side surface frames 10, 10*a* are fixed around the rectangular module glasses 6, thereby forming the rectangular solar cell module. Here, in this example, the frames 1 and the side surface frames 10, 10*a* have different cross section shapes.

On one hand, the holding member 2 comprises a pair of connecting portion 21 insertable in the connection portions 12 of the frames 1 and extending in the direction to spread apart from each other; a down section 22 extending downward from around middle portions of the pair of connecting portions 21; and a seat section 24 arranged at a lower end of the down section 22 and capable of mounting the bottom portion 14 of the frame 1 thereon. Also, the holding member 2 has a connecting portion 23 which extends leftward from the down section 22 between the connecting portion 21 and the seat section surface 24*a* and has an arrow-shaped end 23*a* with its end projecting downward. This seat section 24 has a rectangular section at the right down side from a connecting point with the down section 22 and a C-shaped portion at a left lower side with an opening at the lower side whose size is almost equal to the right lower side rectangle. Also, the seat section surface 24*a* can mount the bottom portion 14 of the frame 1 thereon and has a waterproof rubber 3 (e.g., butyl rubber), which gives a waterproof effect and compromises the rough surface (convex-concave surface) of the roof material 4, attached at a lower side of a seat section lower surface 24*b*. Furthermore, the holding member 2 has a holding portion 25, which extends in an opposite direction to the direction of the connecting portion 23 from the seat section lower surface 24*a* so as to hold the supporting member 42.

This holding member 2 is formed in an almost T shape by a pair of the connecting portions 21 and the down section 22 and is designed to abut against the end of the opening side lower portion of the connection portion 12 of the frame 1 and the other side surface side end of the bottom portion 14 at the side surface of the down section 22, where the frame 1 is restricted its movement toward the other side surface side by the down section 22. Also, the C-shaped chamfer is formed at an angle portion of the end lower side of the connecting portion 21, and the C-shaped chamfer makes the end lower side of the connecting portion incline. Here, a material of the frame 2 is an aluminum extruded material with the same cross section shapes, and colors thereof can be such as black and silver In addition, the length of the holding member 2 is preferably 100 mm-200 mm relative to an extrusion direction, and the holding member 2 is designed shorter than the frame, thereby giving slidability.

As such, the height adjustment can be done by the adjacent roof materials between the seat section surface 24*a* of the seat section 24 of the holding member 2 and the seat section lower surface 24*b*. For example, a flat roof made from asphalt single or straight roof material can be arranged to be lowered for a module cable 61 (FIG. 1) to pass therethough, and the distance/height between the roof material 4 and the bottom surface 14 of the frame 1 can be 7 mm. Also, the surfaces of the adjacent roof materials 4*a* and the frames 1 can have approximately same height when the roof materials 4*a* are thicker such as roof tiles, where adjusting the height gives the feeling of integrity with the building so as to improve the design.

Then, the installation process of the solar cell module using the frame 1 and the holding member 2 for the solar cell module of this embodiment will be explained with reference to FIGS. 1-4. At first, as shown in FIG. 1, the starter hardware 2*a* functioning as the holding member 2 is fixed to the supporting member 42 of such as roof, and the first solar cell module is arranged at the downward pitch side (opposite to the upward pitch side) where the frame 1 of one side (upward pitch side) of the first solar cell module is connected to the starter hardware 2*a*. Then, the holding member 2 is connected to the side (downward pitch side) opposite to the side where the starter hardware 2*a* is connected. At that time, the holding portion 25 of the holding member 2 fixed to the supporting member 42 is connected to the frame 1 of the solar cell module so as to face a direction of the side opposite to the solar cell module. Then, the holding member 2 can be slid relative to the frame 1 to fix the position of the holding member 2 at the supporting member 42 supporting the sheathing slope 41 with the predetermined intervals, thereby fixing the first solar cell module to the supporting member 42.

Next, relative to the holding member 2 which fixes the first solar cell module, the frame 1 at the upward pitch side of the second solar cell module is connected at the downward pitch side thereof. Accordingly, two adjacent frames 1 of the solar cell modules are contacting each other, and the holding members 2 are fixed to the supporting members 42 at the lower side of two solar cell module. Thereafter, in two solar cell modules, the holding member 2 is fixed to the frame 1 at the other side (downward pitch side), and as stated above the holding member 2 is fixed to the supporting member 42 so as to completely fix the second solar cell module, wherein the above-described operation can be repeated to fix the solar cell modules to the supporting members 42 in order from the upward pitch side toward the downward pitch side. Accordingly, according to the solar cell modules retaining structure of this invention, relative to the supporting member 42, multiple solar cell modules can be fixed in order in one direction from a certain point (for example, the starter hardware 2*a*), and the standardization of the installation and installation cost reduction become possible.

To explain further in detail, as shown in FIG. 4(A), the holding member 2 is arranged at an approximate position of the supporting member 42 supporting the sheathing slope 41 with the predetermined intervals, and the engagement protrusion 13 of the frame 1 and the engaging protrusion 23 of the holding member 2 are used to make an engagement therebetween. The engagement between these engagement protrusion 13 and the engaging protrusion 23 restricts the movement in the right angle direction relative to the extension direction of the frame 1, which enables the disengagement of the holding member 2 at the installing process and the smooth sliding, thereby reducing the cost of manufacturing and assembling.

Next, as shown in FIG. 4(B), the holding member 2 can be arranged at a position to be fixed to the supporting member 42, a separate paper (not shown in the figures) of the waterproof rubber 3, corresponding to the rough surface (convex-concave surface) of the waterproof and the roof material 4 underneath the lower surface 24*b* of the seat section, is stripped, and the holding member 2 is arranged on the surface of the roof material 4 at an appropriate position. Thereafter, the holding member 2 is completely fixed to the supporting member 42 by a fastener 5 utilizing the holding screw hole 25*a* of the holding portion 25, and the solar cell module is fixed to the supporting member 42. As such, disengagement of the holding member 2 from the installed position due to an external force applying on the solar cell module (for example, wind load and earthquake load) can be prevented.

Lastly, as shown in FIG. 4(C), after fixing the holding member 2 to the supporting member 42, a bottom end portion 14*a* of the bottom portion 14 of the frame 1 in the second solar cell module the downward pitch side is mounted on the seat section surface 24*a* of the holding member 2, as sliding toward the upward direction, relative to the connecting portion 21 of the holding member 2, the connection portion 12 of the frame 1 is inserted and connected. At that time, since the seat section surface 24*a* at the side where the second solar cell module of the holding member 2 is mounted is longer than the length of the connecting portion 21, the bottom end portion 14*a* of the bottom portion 14 of the frame 1 can easily be mounted on the seat section surface 24*a*. Furthermore, because a portion of the frame 1 at the opening side upper portion of the connection portion 12 inclines while a portion of the holding member 2 at the lower end side of the connecting portion 21 inclines, when the connection portion 12 is connected to the connecting portion 21, the solar cell module does not interfere even if it slants, which allows these members to be slanted as connected, thereby providing easy and cost saving installation.

Then, FIG. 5(A) illustrates an example of installation where the above explained solar cell module retaining structure is arranged on the roof material 4 (for example, a thinner roof material such as asphalt single or straight roof material). Height adjustment between the seat section surface 24*a* of the seat section 24 of the holding member 2 and the seat section lower surface 24*b* thereof can be operated, and the position where the module cable passes can be lowered to arrange the height between the roof material 4 and the lower surface of the bottom portion 14 of the frame 1 to be 7 mm, which gives the feeling of integrity with the building and improves the design.

Also, FIG. 5(B) illustrates an example of installation where the surface of the frame 1 of the above explained solar cell module retaining structure and the surface of the adjacent roof material 4*a* (for example, a thicker roof material such as roof tiles) are almost the same height. As stated above, the height of the seat section surface 24*a* of the seat section 24 of the holding member 2 and the seat section lower surface 24*b* can be adjusted, and for the roof material 4*a* with thicker adjacent roof material such as roof tiles, the surfaces of the adjacent roof materials 4*a* and the frames 1 can have approximately same height, where adjusting the height gives the feeling of integrity with the building so as to improve the design.

Also, for the solar cell module retaining structure, as shown in FIGS. 3(B) and 3(C), instead of the side surface frame 10, different side surface frames 10*a* can have notched grooves 10*d* through which the holding member 2 can pass at both sides of the solar cell module, and while the solar cell modules with the side surface 10*a* are jointed to be fixed on the roof material 4 by the holding member 2, the side surface cap 10*b* can be used to cover to close the facing notched grooves 10*d* of the side surface frames 10*a* In addition, the side surface cap 10*b* can be aluminum or color steel plate (such as galbarium steel plate), and the frame 1 and the side surface frame 10*a* are colored the same.

To explain more in detail, as shown in FIG. 3(C), size of the notched groove 10*d* of the side surface frame 10*a* is arranged so that the connecting portion 21 of the holding member 2 and the engaging protrusion 23 do not interfere, while the size of the side surface cap 10*e* is arranged so to sufficiently cover the facing notched grooves 10*d*. Then, the side surface cap 10*b* can be attached to the frame 1 using a portion of the frame fixing screw 10*e* as bridging two solar cell modules.

After the notched grooves 10*d* of the side surface frames 10*a* and the side surface cap 10*b* are used to fix and place the solar cell modules on the roof material 4, when maintenance of the solar cell modules is being performed, by removing the side surface cap 10*e* and sliding the solar cell modules laterally (in an extending direction of the frame 1) using the engagement function between the engagement protrusion 13 of the frame 1 and the engaging protrusion 21 of the holding member 2, the solar cell modules can be removed from the holding members 2 through the notched grooves 10*d* As such, when in an normal installation process, the arrangement of the side surface cap 10*b* increases the design of the solar cell modules and prevents the horizontal/lateral disengagement of the solar cell modules, and when the maintenance after installing the solar cell module is necessary, the solar cell modules can be removed without removing the holding member 2 from the roof material 4 and the maintenance operation is possible with reduced risk of breaking the roof material 4 and leakage.

As stated above, according the solar cell module retaining structure with the frame 1 and the holding member 2 of the solar cell module of this embodiment, the number of members relating to the solar cell module retaining structure can be reduced and standardizing the installation process is possible, which reduce the cost of manufacturing and installation and improves the design thereof.

Also, the holding member 2 can freely be slid relative to the frame 1, and therefore the holding member 2 can be positioned at the supporting member 42 supporting the sheathing slope 31 with the predetermined intervals, and the fastener 5 can be used to firmly hold the solar cell module.

In addition, after fixing the solar cell modules by the holding members 2 via the frames 1, the solar cell modules a the downward pitch side can be fixed with the holding members 2. At that time, the holding portion 25 of the holding member 2 to be fixed at the supporting member 42 is fixed at the supporting member 42 at the lower side of the solar cell module at the downward pitch side, thereby making the frames 1 contacting each other. Furthermore, the solar cell modules are connected to make an almost flush surface, which improves the design without using the member such as a cover. Also, because the frames 1 of the solar cell modules arranged adjacent to each other are connected to each other, as long as the solar cell modules are in the same size, an installation surface of the solar cell module can be minimized, thereby preventing the reduction of the number of installation of the solar cell modules on such as roof.

Furthermore, because the frames 1 are designed to have matching same cross section surfaces as two facing sides of the solar cell module, the frames 1 with different cross section surface shapes are not necessary for the solar cell module to be fixed to the supporting member, which reduces the number of parts to cut down the manufacturing cost of the solar cell module retaining structure.

Also, using the insertion support portion 11 of the frame 1 and the insertion support portion of the side surface frame 10, a conventional module glass 6 (solar cell panel body) with solar cells can be inserted and supported.

Furthermore, since adjacent solar cell modules can be jointed with the side surface caps 10*b*, one solar cell module and the adjacent other solar cell module can be electrically connected via the side surface cap 10*b* and the frame holding screw 10*e*, and therefore when installing groundings between the solar cell modules, there is no need to separately install the cables for groundings and prepare additional parts for the groundings, and the solar cell modules can easily be connected each other, which reduces the cost in relation to the grounding.

Up to now, although the preferred embodiments of this invention were explained, this invention is not limited to the above-identified embodiments, and as shown in the following sections, various improvements and modification of the design are possible without departing from the scope of this invention.

Figure 6:
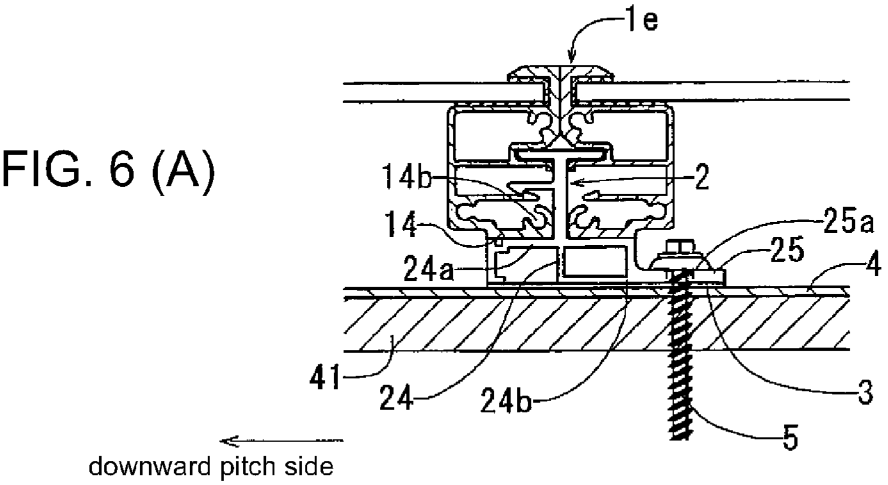
FIG. 6(A) is a cross section of the solar cell module retaining structure of this invention using the frame and the side surface cap with different cross sections from the FIG. 2 and FIG. 3.
FIG. 6(B) is a cross section of the solar cell module retaining structure of this invention using the frame and the side surface cap with different cross sections from the FIG. 2 and FIG. 3.
FIG. 6(C) is a cross section of the solar cell module retaining structure of this invention using the frame and the side surface cap with different cross sections from the FIG. 2 and FIG. 3.
Figure 6:
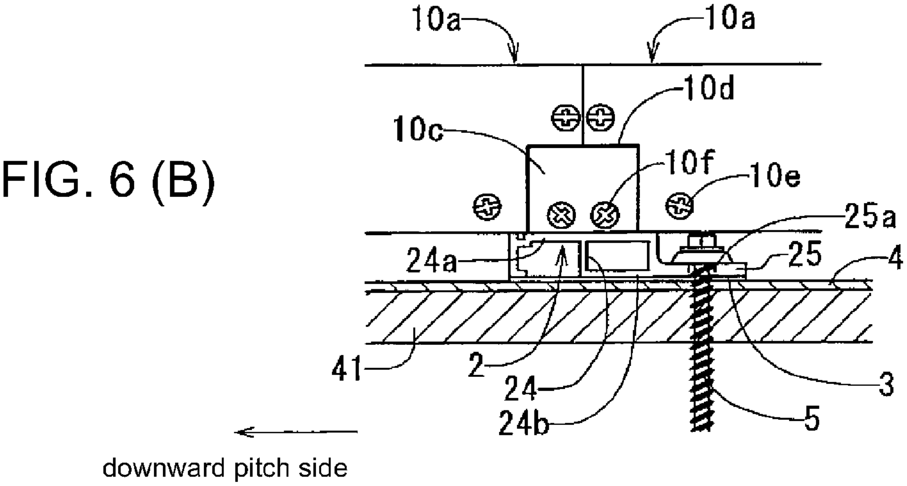
Figure 6:
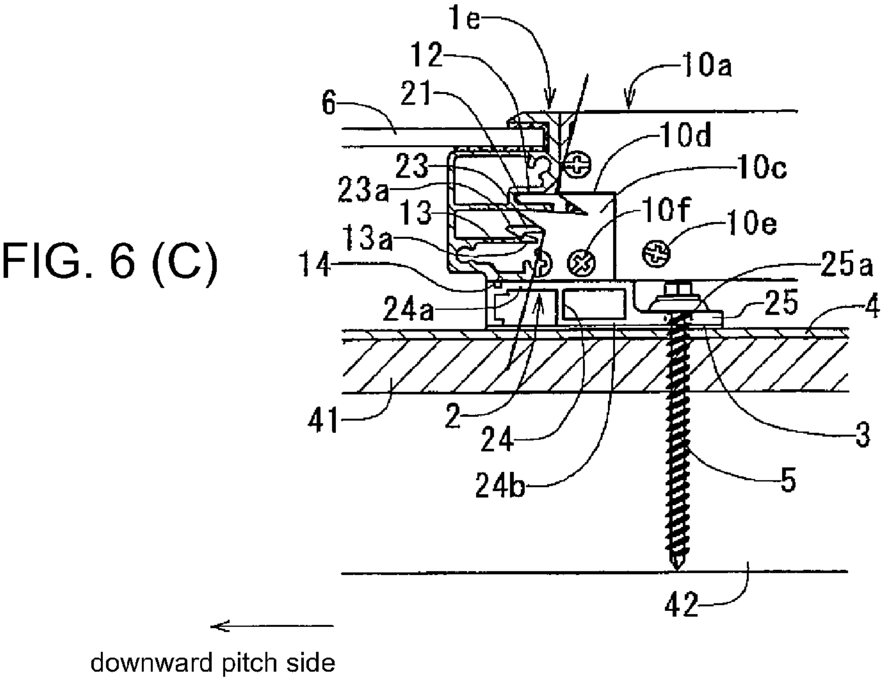

That is, in the above embodiments, the screw hole for fixing the side surface frame 10*a* of the frame 1 are also used to install the side surface cap 10*b*; however, as shown in FIGS. 6(A)-6(C), the screw hole 14*b* for the side surface cap can be provided at the frame 1*e*, and the side surface cap 10*c* can be fixed by the side surface cap holding screw 10*f*. Furthermore, the side surface cap 10*c* is sized to be in the notched grooves 10*d* of the facing side surface frames 10*a* and is heightened the same as the side surface frames 10*a* which improves the design thereof. Furthermore, when the maintenance operation is necessary, there is no need for the frame holding screw 10*e* for fixing the frames 1 and the side surface frames 10*a* to be loosen, which removes the possibility of loosening the frame connections. Also, the side surface cap holding screw 10*f* is additionally required; however, as shown in FIG. 6(C), the frame holding screw 10*e* and the side surface cap holding screw 10*f* are clearly separated, which gives a better maintenance access and eliminates the chance of misselecting the screw for removal.

Figure 7:
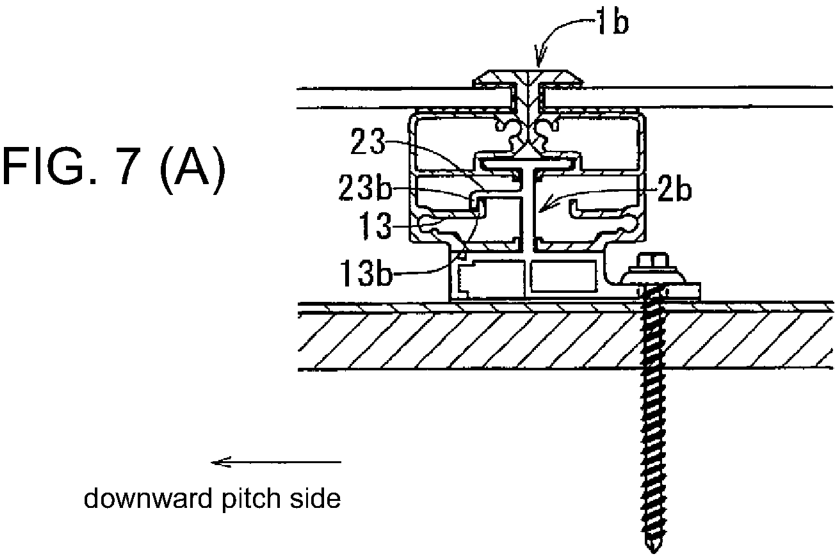
FIG. 7(A) is a perspective cross section view of the frame and the holding member for the solar cell module of another embodiment of this invention.
FIG. 7(B) is another perspective cross section view of the frame and the holding member for the solar cell module of another embodiment of this invention, where the frame has the extending piece extending in the opposite side of the bottom portion of the frame.
FIG. 7(C) is another perspective cross section view of the frame and the holding member for the solar cell module of another embodiment of this invention, having the L-shaped end and the L-shaped end.
Figure 7:
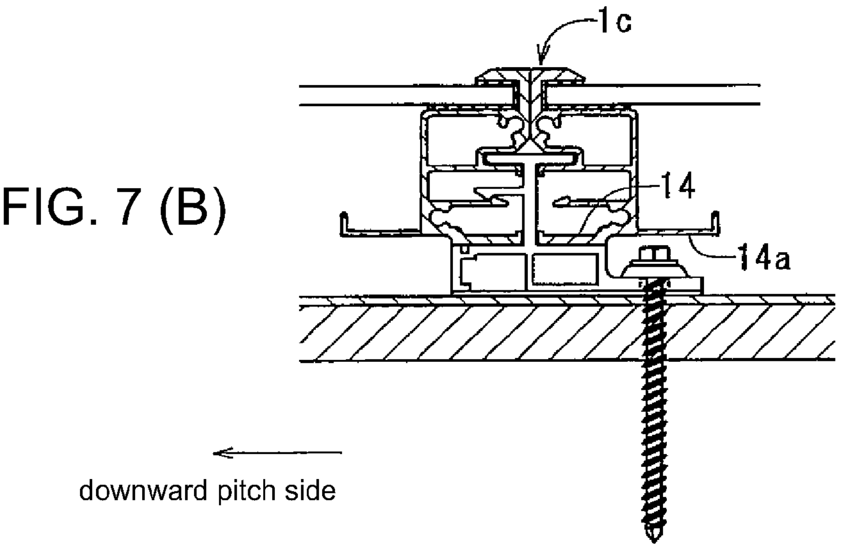
Figure 7:
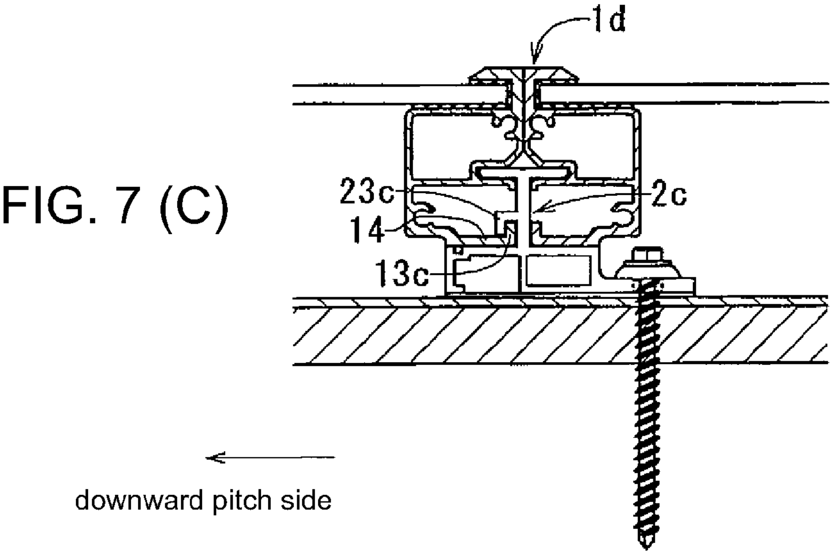
Figure 8:
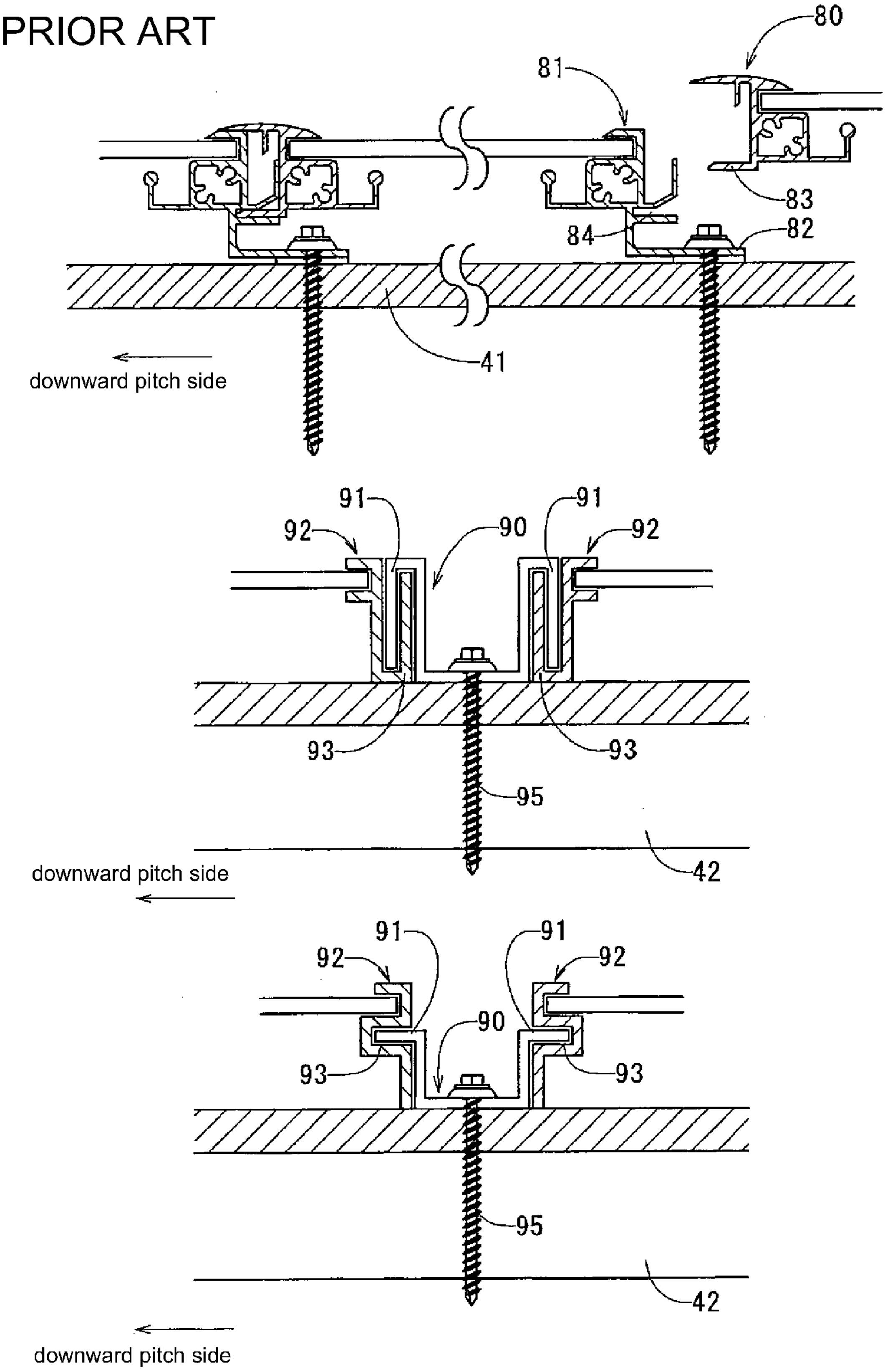
FIG. 8 is a perspective cross section view of an example of the conventional solar cell module.

Also, in the above-description, the engagement protrusion 13 of the frame 1 has the engagement protrusion 13 with the arrow-shaped end portion 13*a* with an projecting top at the frame 1 and the engaging protrusion 23 has the arrow-shaped end portion 23*a* with projecting lower end at the holding member 2; however, this invention is not limited thereto, and L-shaped end 13*b* as in FIG. 7(A) and the L-shaped end 23*b* are possible. Concretely, the L-shaped end 13*b* of the engagement protrusion 13 and the L-shaped end 23*b* of the engaging portion 23 provide firmer engagement than the arrow-shaped engagement. In the normal installation process, the holding member 2 is arranged at an approximate position of the supporting member 42 supporting the sheathing slope 41 with the predetermined intervals, and the engagement protrusion 13 of the frame 1 and the engaging protrusion 23 of the holding member 2 are used to make an engagement therebetween; however, for example when installing on a vertical/perpendicular wall, the load on the engagement protrusion 13 and the engaging protrusion 23 is increased. Accordingly, the L-shaped end 13*b* of the frame 1*b* and the L-shaped end 23*b* of the holding member 2*b* provides firmer engagement force.

Furthermore, as shown in FIG. 7(B), the frame 1*c* can have a extending piece 14*a* extending in an opposite side of the bottom portion 14 of the frame. The extending piece 14*a* increases the strength of the frame 1*c* against the deflection compared to the frame 1 with respect to X direction (direction along the supporting member) and Y direction (right angle direction to the supporting member). For example, a stronger frame 1 is necessary when installing the solar cell module in snow area or area that often encounters gust wind. The extending piece 14*a* functions as the reinforcement part for the frame 1.

Also, in the above-described embodiments, the engagement protrusion 13 has the arrow-shaped end portion 13*a* around the center of the connection portion 12 and the bottom portion 14, extending in the same direction of the bottom portion 14 and having an arrow projecting top, and the engaging protrusion 23 has the arrow-shaped end portion 23*a*, extending in the left side from the down portion 22 between the connecting portion 21 and the seat section surface 24*a* and having the projecting lower end; however, this invention is not limited thereto, and as shown in FIG. 7(C), the L-shaped end 13*c* and the L-shaped end 23*c* are possible. Concretely, the L-shaped end portion 13*c* can be located at the end of the bottom portion 14 of the frame 1, and the engaging portion 23 of the holding member 2 can engage with the L-shaped end portion 23*c* Accordingly, unlike the frame 1, there is no need for the engagement protrusion 13, and the functions of the bottom portion 14 and the engagement protrusion can be shared, which reduce the necessary area space and the cost of frame 1.

It is readily apparent that the above-described embodiments have the advantage of wide commercial utility. It should be understood that the specific form of the invention hereinabove described is intended to be representative only, as certain modifications within the scope of these teachings will be apparent to those skilled in the art. Accordingly, reference should be made to the following claims in determining the full scope of the invention.

I claim:

1. A solar cell module retaining structure, where the solar cell module has a flat polygon solar cell panel body with at least a pair of facing edges, the solar cell module retaining structure comprising:

frames connected to the at least pair of facing edges of said solar cell panel bodies; and a holding member to be fixed to a supporting member, wherein when said panel bodies are adjacent to each other, the panel bodies are connectable by the holding members wherein each of said frames is comprised of:

an insertion support portion which has an opening at a first side surface side and into which a peripheral portion of the solar cell panel body is inserted to be supported;

a connection portion arranged at a lower side of the insertion support portion and having an opening at a second side surface side at an opposite side of the first side surface; and an engagement protrusion arranged in an opening at the second side surface side of the frame and at a lower side of the connection portion, the engagement protrusion extending from the second side surface side to the first side surface side, and projecting upward at an end thereof, and the frame has the same shape in cross-section throughout the entire length of the frame in a longitudinal direction, and wherein said holding member is comprised of:

a pair of connecting portions extending in mutually opposite directions, the pair of connecting portions departing from each other, the pair of connecting portions matingly engageable with the connection portion of said frame;

a down section located between and extending downward from the pair of the connecting portions;

a seat section arranged at a lower end of the down section and capable of mounting a bottom of the frame thereon;

an engagement piece having an engagement protrusion portion positioned between the seat section and the connecting portion and extending from the down section in one direction of the mutually opposite directions of said connecting portion, said engagement piece further has a shaped end so as to matingly engage the engagement protrusion of said frame; and a holding portion whose lower surface is flush with a lower surface of the seat section to form a part of a base of said holding member, the holding portion extending away in the other direction of the mutually opposite directions and being fixed to a supporting member, and the holding member is designed to have the same cross-section shape in a longitudinal direction and to be shorter than the frame in a longitudinal direction, wherein the holding members are slidable relative to the frames, attaches the frames of two solar cell modules arranged in an extending direction of the supporting member to arrange the solar cell modules to make an almost flush surface, restricts one of the two solar cell modules to move in a right angle direction relative to an extending direction of the frames, and is fixed to the supporting member by said holding portion where the holding portion is located between the solar cell module and the supporting member, whereby the holding member is capable of fixing one of the two solar cell modules to the supporting member and thereafter fixing the other of the two solar cell modules to the supporting member.

2. The solar cell module retaining structure according to claim 1, wherein the other solar cell module is placed on a roof slope at a downward pitch side thereof with the holding member therebetween.

3. The solar cell module retaining structure according to claim 1, wherein the frame has an upper portion at an opening side of the connection portion thereof that inclines, and the holding member has a portion that inclines at a lower side of a tip of the connecting portion.

4. The solar cell module retaining structure according to claim 2, wherein the frame has an upper portion at an opening side of the connection portion thereof that inclines, and the holding member has a portion that inclines at a lower side of a tip of the connecting portion.

5. The solar cell module retaining structure according to claim 1, further comprising:

a side surface frame that is fixed to an edge of the solar cell panel body, which is different from an edge of the solar cell panel body, to which the frame is fixed, and has a notched groove through which the holding member can pass; and a side surface cap that covers the notched groove of the side surface frame and is fixed to the frame, wherein by removing the side surface cap, while the holding member is supported at the supporting member, the solar cell module fixed by the holding member can be slid in an extending direction of the frame to remove the solar cell module from the holding member.

6. A frame for a solar cell module retaining structure, where the solar cell module has a flat polygon solar cell panel body with at least a pair of facing edges, where said retaining structure has holding members and frames that are fixed respectively to a supporting member and to the at least pair of facing edges of said solar cell panel bodies; and when said panel bodies are adjacent to each other, said panel bodies are connectable by the holding members, the frame comprising:

an insertion support portion with an opening at a first side surface side and into which a peripheral portion of the solar cell panel body is inserted to be supported;

a connection portion which is arranged at a lower side of the insertion support portion and has an opening at a second side surface side at an opposite side of the first side surface; and an engagement protrusion arranged in an opening at the second side surface side of the frame and at a lower side of the connection portion, the engagement protrusion extending from the second side surface side to the first side surface side, and projecting upward at an end thereof, said frame has the same shape in cross-section in a longitudinal direction and is longer than the holding member, wherein the holding member includes:

a pair of connecting portions extending mutually opposite directions, the pair of connecting portions departing from each other, the pair of connecting portions matingly engageable with the connection portion of said frame;

a down section located between and extending downward from the pair of the connecting portions;

a seat section arranged at a lower end of the down section and capable of mounting a bottom of the frame thereon;

an engagement piece having an engagement protrusion portion positioned between the seat section and the connecting portion and extending from the down section in one direction of the mutually opposite directions of said connecting portion, said engagement piece further has a shaped end so as to matingly engage the engagement protrusion of said frame; and a holding portion that forms a part of a base of said holding member and extends away in the other direction of said mutually opposite directions, that is fixed to a supporting member, and the holding member is designed to have the same cross-section shape in a longitudinal direction.

7. A holding member for a solar cell module retaining structure for retaining a solar cell module, which has a flat polygon solar cell panel body with a solar cell and frames to be fixed respectively to at least a pair of facing edges of the solar cell panel bodies adjacent to each other, on a supporting member by connecting the holding members with the frames fixed to the respective facing edges of the solar cell module, the holding member comprising:

a pair of connecting portions extending in a direction to depart from each other; a down section extending downward from the pair of the connecting portions;

a seat section arranged at a lower end of the down section and capable of mounting a bottom of the frame thereon, an engagement piece having an engagement protrusion portion positioned between the seat section and the connecting portion and extending from the down section in the same direction of the connecting portion to project an end downward; and a holding portion having a lower surface on the same surface of the lower surface of the seat section and extending in an opposite direction of the engagement piece extension so as to be fixed to the supporting member, the holding member being designed to have the same cross-section shape in a longitudinal direction and to be shorter than the frame in a longitudinal direction, wherein the frame includes:

an insertion support portion which has an opening at a first side surface side and into which a peripheral portion of the solar cell panel body is inserted to be supported;

a connection portion which is arranged at a lower side of the insertion support portion and has an opening at a second side surface side at an opposite side of the first side surface, the pair of connecting portions of the holding member matingly engageable with the connection portion; and an engagement protrusion which is arranged at a lower side of the connection portion and has an opening at the second side surface side to project upward, the engagement protrusion portion of the holding member being configured to engage the engagement protrusion, and the frame is designed to have the same cross-section shape in a longitudinal direction.

8. The holding member according to claim 7, wherein the seat section extends beyond the outer most section of said connection portion.

9. The holding member according to claim 7, wherein the distance between the lower surface of the frame and the supporting member is large enough so that a module cable connected to the solar cell panel body can pass therethrough, and an upper surface of the solar cell module body is adjustable so that height thereof is approximately equal to a roof material mounted on the supporting member.

10. The holding member according to claim 8, wherein the distance between the lower surface of the frame and the supporting member is large enough so that a module cable connected to the solar cell panel body can pass therethrough, and an upper surface of the solar cell module body is adjustable so that height thereof is approximately equal to a roof material mounted on the supporting member.

* * * * *